United States Patent
Wilson (12)

(10) Patent No.: US 6,659,527 B1
(45) Date of Patent: Dec. 9, 2003

(54) INTERIOR TRIM ATTACHMENT APPARATUS AND METHOD FOR A VEHICLE

(75) Inventor: Douglas J. Wilson, Ft. Gratiot, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/246,139

(22) Filed: Sep. 18, 2002

(51) Int. Cl.[7] .................................................. B60J 3/00
(52) U.S. Cl. ................................... 296/97.11; 296/97.9
(58) Field of Search ............................ 296/97.9, 97.11, 296/214

(56) References Cited

U.S. PATENT DOCUMENTS

| | | | |
|---|---|---|---|
| 3,017,217 A | | 1/1962 | Keating |
| 5,031,954 A | * | 7/1991 | Peterson et al. ............ 296/97.9 |
| 5,082,322 A | * | 1/1992 | Cekander et al. .......... 296/97.9 |
| 5,201,564 A | | 4/1993 | Price |
| 5,403,064 A | * | 4/1995 | Mahler et al. ............... 296/214 |
| 5,451,022 A | * | 9/1995 | Peterson ................ 248/289.11 |
| 5,499,854 A | | 3/1996 | Crotty, III et al. |
| 5,697,140 A | | 12/1997 | Crotty, III et al. |
| 5,765,897 A | * | 6/1998 | Snyder et al. .............. 296/97.9 |
| 5,975,617 A | | 11/1999 | Jacquemin et al. |
| 6,003,928 A | | 12/1999 | Curtindale |
| H1834 H | | 2/2000 | Wilson et al. |
| 6,021,986 A | | 2/2000 | Murdock |
| 6,068,323 A | | 5/2000 | Brown et al. |
| 6,234,558 B1 | | 5/2001 | Curtindale |
| 6,250,708 B1 | | 6/2001 | Kurachi |

FOREIGN PATENT DOCUMENTS

JP     P2001-280315 A     10/2001

\* cited by examiner

*Primary Examiner*—Joseph D. Pape
*Assistant Examiner*—Patricia Engle
(74) *Attorney, Agent, or Firm*—Bill C. Panagos

(57) ABSTRACT

A mount assembly and method are provided for securing a visor to a vehicle mounting surface. Initially, a vehicle mounting surface having an aperture formed therein is provided. A bracket assembly including a bracket having a first aperture, a latch slidably mounted to the bracket, and an arm disposed within the first aperture of the bracket are also provided. The arm is then rotated to a first position wherein the latch is caused to move to an inwardly retracted position. The bracket assembly is then placed adjacent the mounting surface such that a portion of the bracket and the latch are inserted into the aperture in the mounting surface. The arm is then rotated to a second position wherein the latch is caused to move to an outwardly extended position, the bracket thereby being locked relative to the mounting surface.

24 Claims, 6 Drawing Sheets

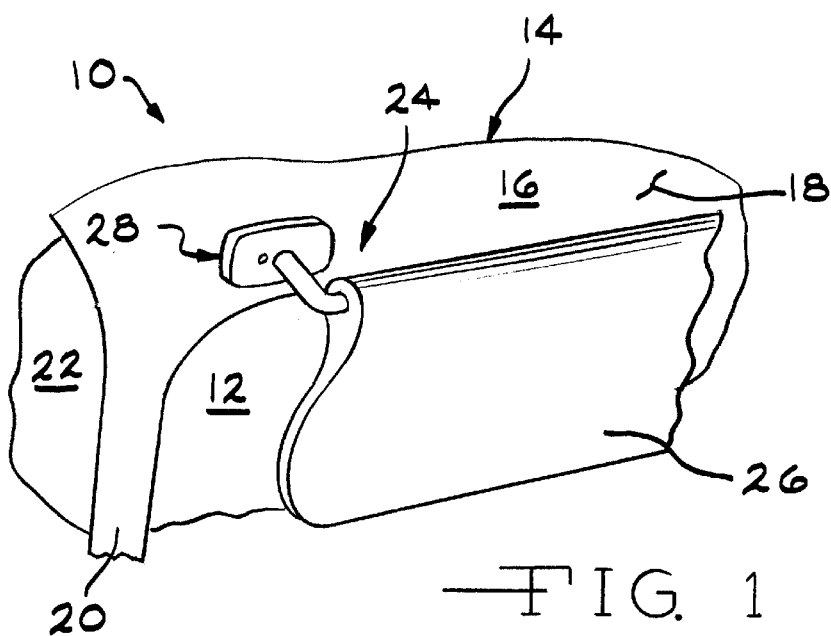
FIG. 1
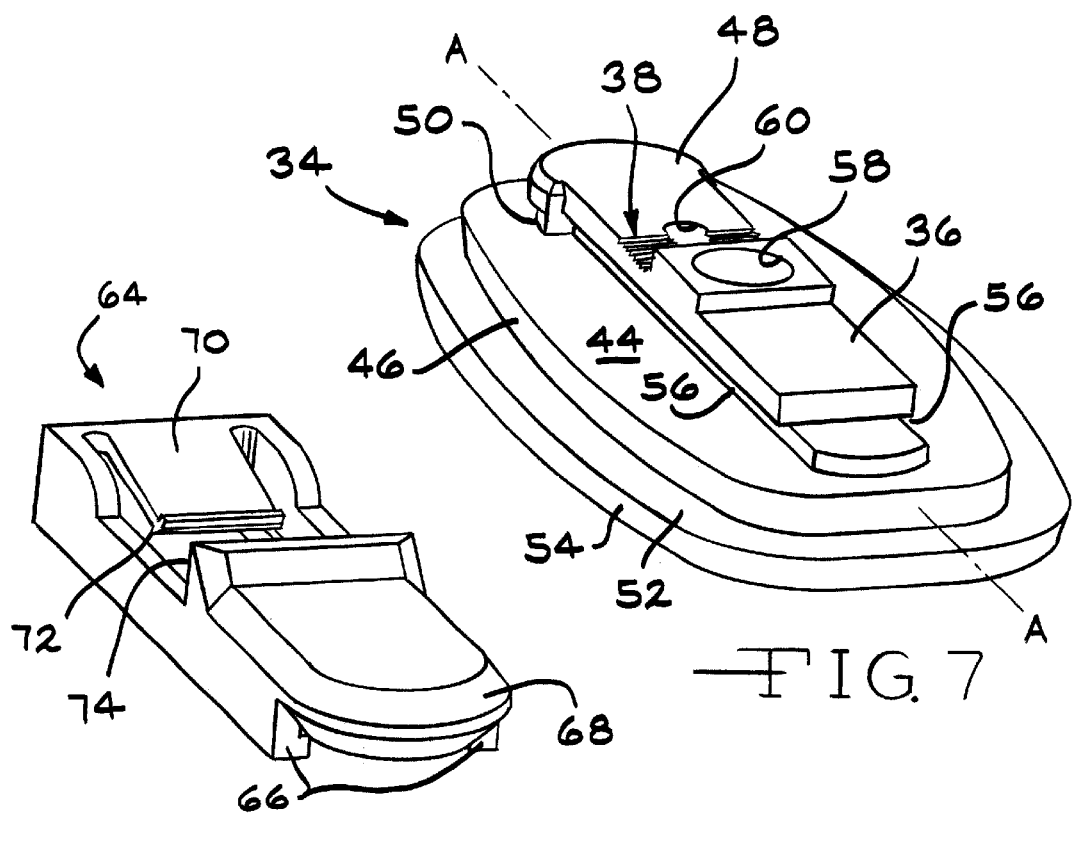
FIG. 7
FIG. 8

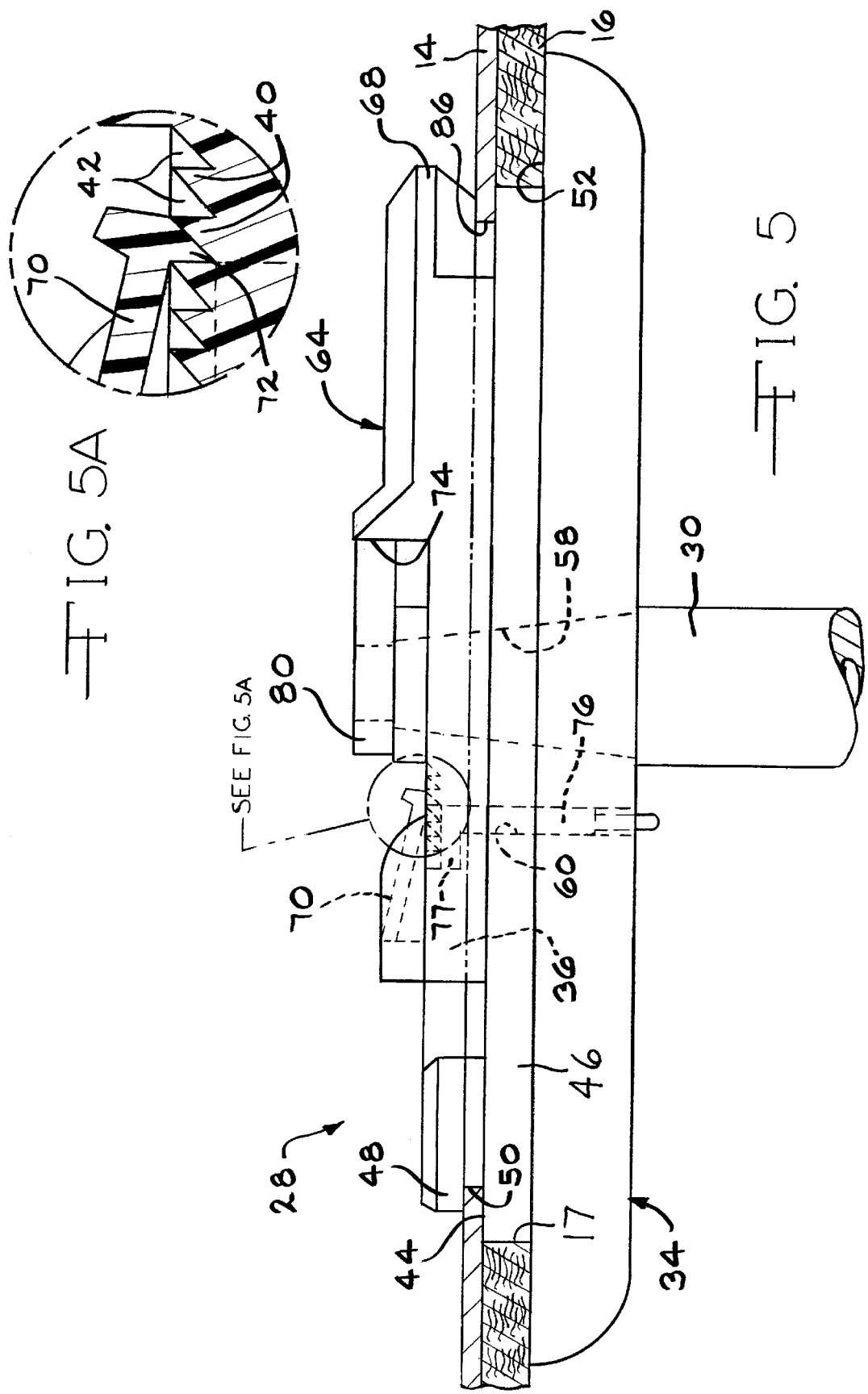

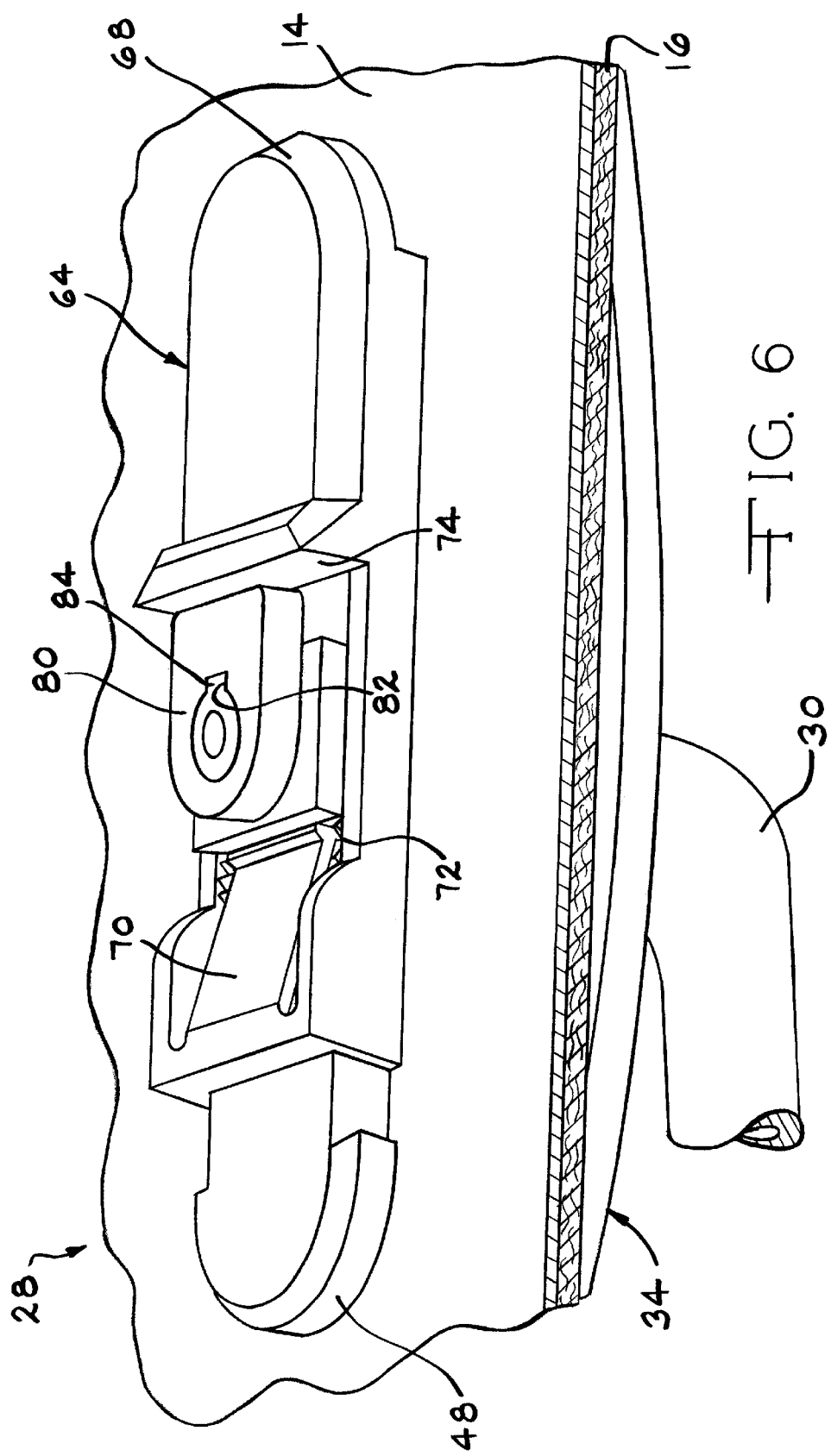

INTERIOR TRIM ATTACHMENT APPARATUS AND METHOD FOR A VEHICLE

BACKGROUND OF THE INVENTION

The present invention relates to attachment devices and more particularly to a mount assembly and method for securing a visor to a vehicle mounting surface.

When driving a vehicle it is desirable to shield an occupant's eyes from glaring sunlight which enters the vehicle interior through the windshield or the side windows. As a result, vehicle interiors are usually equipped with sun visors.

Visors typically include a visor body and a pivot rod assembly. The pivot rod assembly typically includes an L-shaped pivot rod, a torque control, and a means for mounting the rod to the vehicle roof and/or headliner. The torque control rotationally mounts the visor body to the pivot rod. The torque control allows the visor body to be moved between, and held at, various rotational positions with respect to the rod. This allows the visor to be moved between a lowered position adjacent the windshield or side window to a raised position adjacent the roof and/or headliner.

A number of methods have been proposed for mounting the pivot rods to the roof and/or headliner. One known method includes a mount attached to the roof and/or headliner by screws or barbed Christmas-tree type fasteners. However, screws can be difficult to install on a quickly moving assembly line since the power screw drivers often inadvertently disengage the screw head and irreparably mar the adjacent trim panel or bezel. This leads to poor quality or costly removal and scrapping of the expensive trim panel. Furthermore, insertion of multiple screws is time consuming. Moreover, the installed screws are typically considered to be unattractive and are sometimes hidden by caps, especially for luxury vehicles. Christmas tree type fasteners, on the other hand, are more aesthetically pleasing and easy to install but are typically not reusable once removed, and are not suitable for withstanding loads within moving parts.

Another known method of mounting includes a snap-in type mount. This type of mount includes a snap-fit connector inserted within a hole in the roof and/or headliner. Often, the pivot rod is attached to the mount prior to installation in the vehicle. However, snap-in mounts can be damaged or broken as the sun visor rod and mount are snapped into place. Such snap in mounts often can be removed with only a relatively small force, and are thereby not very stable. Therefore, it would be advantageous to provide an improved interior trim attachment apparatus for an automotive vehicle.

SUMMARY OF THE INVENTION

This invention relates to an improved mount assembly and method for securing a visor to a vehicle mounting surface. Initially, a vehicle mounting surface having an aperture formed therein is provided. A bracket assembly including a bracket having a first aperture, a latch slidably mounted to the bracket, and an arm disposed within the first aperture of the bracket are also provided. The arm is then rotated to a first position wherein the latch is caused to move to an inwardly retracted position. The bracket assembly is then placed adjacent the mounting surface such that a portion of the bracket and the latch are inserted into the aperture in the mounting surface. The arm is then rotated to a second position wherein the latch is caused to move to an outwardly extended position, the bracket thereby being locked relative to the mounting surface.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a fragmentary perspective view of a sun visor assembly according to the invention, as installed in a vehicle.

FIG. 5 is an elevational view of the visor bracket assembly illustrated in FIG. 2 showing the visor mount assembly in the extended position and showing the release button in the locked position.

FIG. 5A is an enlarged cross sectional view of the flex leg illustrated in FIG. 5 showing the visor bracket assembly in the locked position.

FIG. 6 is an enlarged perspective view of the visor bracket assembly illustrated in FIGS. 2 and 5 showing the visor mount assembly in the extended position.

FIG. 7 is a perspective view of the bracket illustrated in FIG. 2.

FIG. 8 is a perspective view of the latch illustrated in FIG. 2.

DETAILED DESCRIPTION OF THE INVENTION

Figure 2:
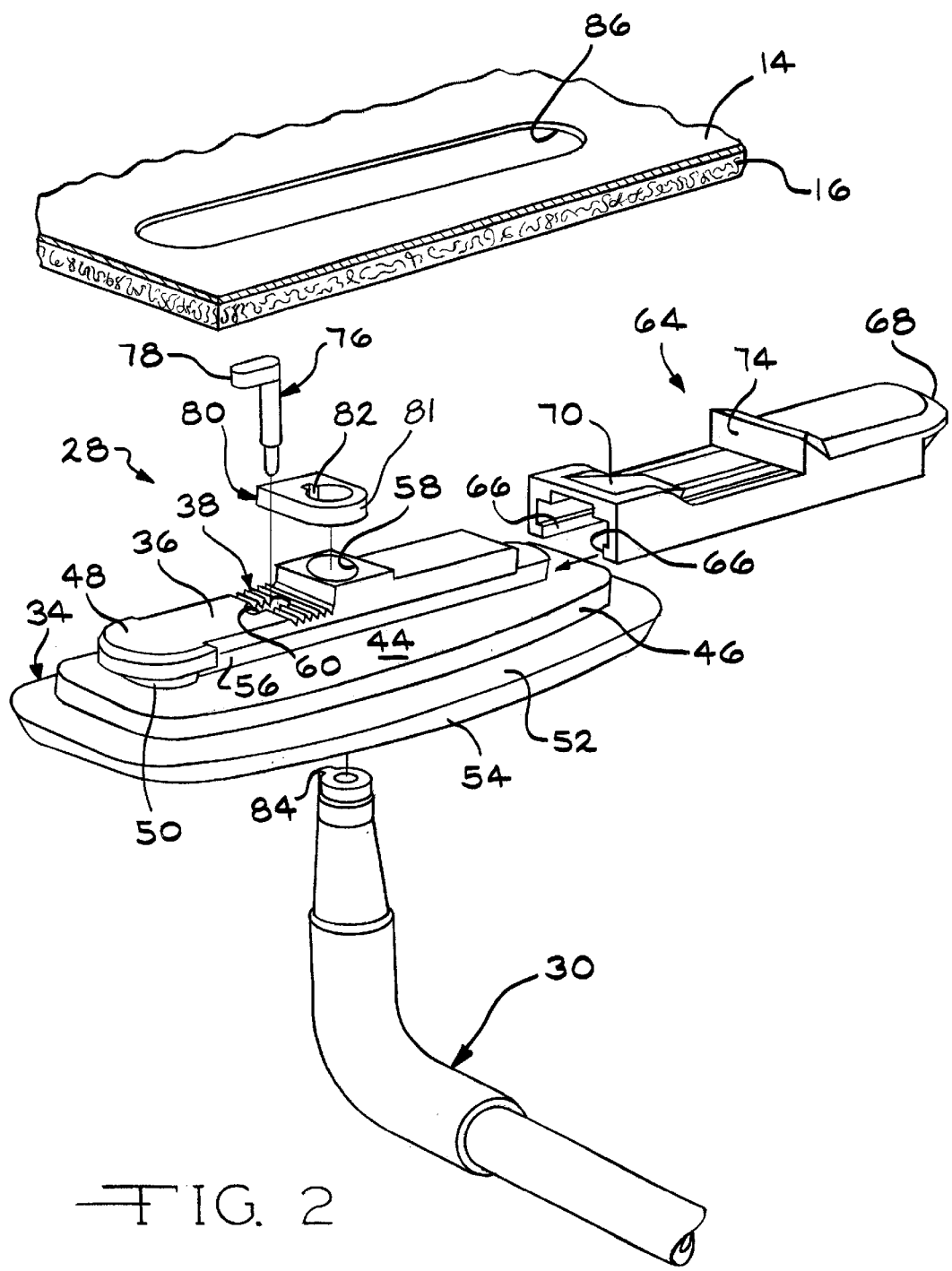
FIG. 2 is an enlarged exploded perspective view of the visor bracket assembly illustrated in FIG. 1.

Referring to FIG. 1, a vehicle 10 includes a windshield 12 and a vehicle mounting surface or roof 14. Preferably, the roof 14 is formed of sheet metal, although such is not required. The roof 14 provides structural support for the vehicle interior, and is typically covered by a headliner 16 having an upholstered surface 18 to provide an aesthetically pleasing appearance to the vehicle.

The vehicle further includes a windshield pillar 20 separating the windshield 12 and a side window 22. A sun visor assembly 24 is shown on the driver's side of the vehicle. The sun visor assembly 24 includes a visor body 26, and a visor mount or bracket assembly 28.

Preferably, the visor body 26 includes a substrate formed from plastic, foam, or pressboard. The substrate can also be formed of any desired material. The substrate is preferably covered with cloth or vinyl. The sun visor assembly 24 preferably includes a visor arm 30 for mounting the visor body 26 to a mounting surface, such as the sheet metal of the vehicle roof 14, as will be described below, and a torque control (not shown). The torque control rotationally mounts the visor body 26 to the visor arm 30, and is preferably mounted within the visor body 26. The torque control can be any desired type of torque control that allows the visor body 26 to be moved between, and held at, various rotational positions with respect to the visor arm 30. The torque control allows the visor body 26 to be moved between a lowered position substantially adjacent the windshield 12 or side window 20, and a raised position substantially adjacent the roof 14 and/or headliner 16. The visor arm 30 can also rotate with the visor body 26 from the position substantially adjacent the windshield 12, to the position substantially adjacent the side window 20.

As best shown in FIGS. 2 and 7, the visor bracket assembly 28 includes a bracket 34 having a longitudinal axis A and a latch receiving portion 36. The latch receiving portion 36 includes a ratchet surface 38. A plurality of ratchet teeth 40 is formed in the ratchet surface 38. Preferably, the ratchet teeth 40 are formed transverse to the axis A. Ratchet grooves 42 are defined between adjacent ratchet teeth 40. The latch receiving portion 36 extends upwardly, as viewed in FIG. 2, from a substantially flat first engagement surface 44 of a first bracket portion 46. A bracket flange 48 extends outwardly from one end of the latch receiving portion 36.

The bracket flange 48 defines a first mounting groove 50 between the flange 48 and the first engagement surface 44. Preferably, a leading edge of the bracket flange 48 is beveled, although such is not required. The first bracket portion 46 extends upwardly, as viewed in FIG. 2, from a substantially flat second engagement surface 52 of a second bracket portion 54. Substantially parallel latch grooves 56 are formed on opposite sides of the latch receiving portion 36. A first aperture 58 is centrally formed through the bracket 34. A second aperture 60 is formed through the ratchet teeth 40 of the ratchet surface 38. The purpose of the first and second apertures, 58 and 60 will be explained below.

As best shown in FIGS. 2 and 8, a latch 64 includes inwardly extending flanges or rails 66 for slidably mounting the latch 64 within the latch receiving grooves 56 of the bracket 34. A latch flange 68 extends outwardly from one end of the latch 64. Preferably, a leading edge of the latch flange 68 is beveled, although such is not required. A substantially flexible leg 70 is formed at the other end of the latch 64. A lower surface of the leg 70 includes a ratchet pawl 72. A substantially vertical camming surface 74, as viewed in FIG. 2, is formed in a central portion of the latch 64. Preferably, the leg 70 is downwardly biased, as viewed in FIGS. 5 and 5A.

A release pin or button 76 can be inserted into the second aperture 60. The release button 76 illustrated is substantially cylindrical and includes an L-shaped portion 78, although such a shape is not required. The release button 76 can have any desired shape. The release button 76 is preferably disposed in a first position, as shown in FIGS. 5 and 6, wherein the bracket assembly 28 is in a locked position. The release button 76 can also be moved to a second position, as shown in FIG. 3, wherein the bracket assembly 28 is in an unlocked position.

Pre-assembly and installation of the sun visor assembly 24 will now be discussed with reference to FIGS. 2 through 6, inclusive. Prior to installation of the sun visor assembly 24 into a vehicle roof, the visor bracket assembly 28 is preferably pre-assembled. During pre-assembly, the release button 76 is first disposed in the first position. In the first position, the button 76 is placed in the second aperture 60, such that the L-shaped portion rests upon a surface 77, as shown in FIG. 5. An upward force is then applied to the button 76, disengaging the ratchet pawl 72 from the groove 42, and moving the button 76 to the second position, as shown in FIG. 3. The latch rails 66 are then inserted into the latch grooves 56, allowing the latch 64 to be slid into an inwardly retracted position, as shown in FIGS. 3 and 4. The upward force is then removed from the button 76, allowing the button 76 to return to the first position. The visor arm 30 in then inserted into the first aperture 58 such that an end 31 of the visor arm 30 is exposed above the latch receiving portion 36.

Figure 3:
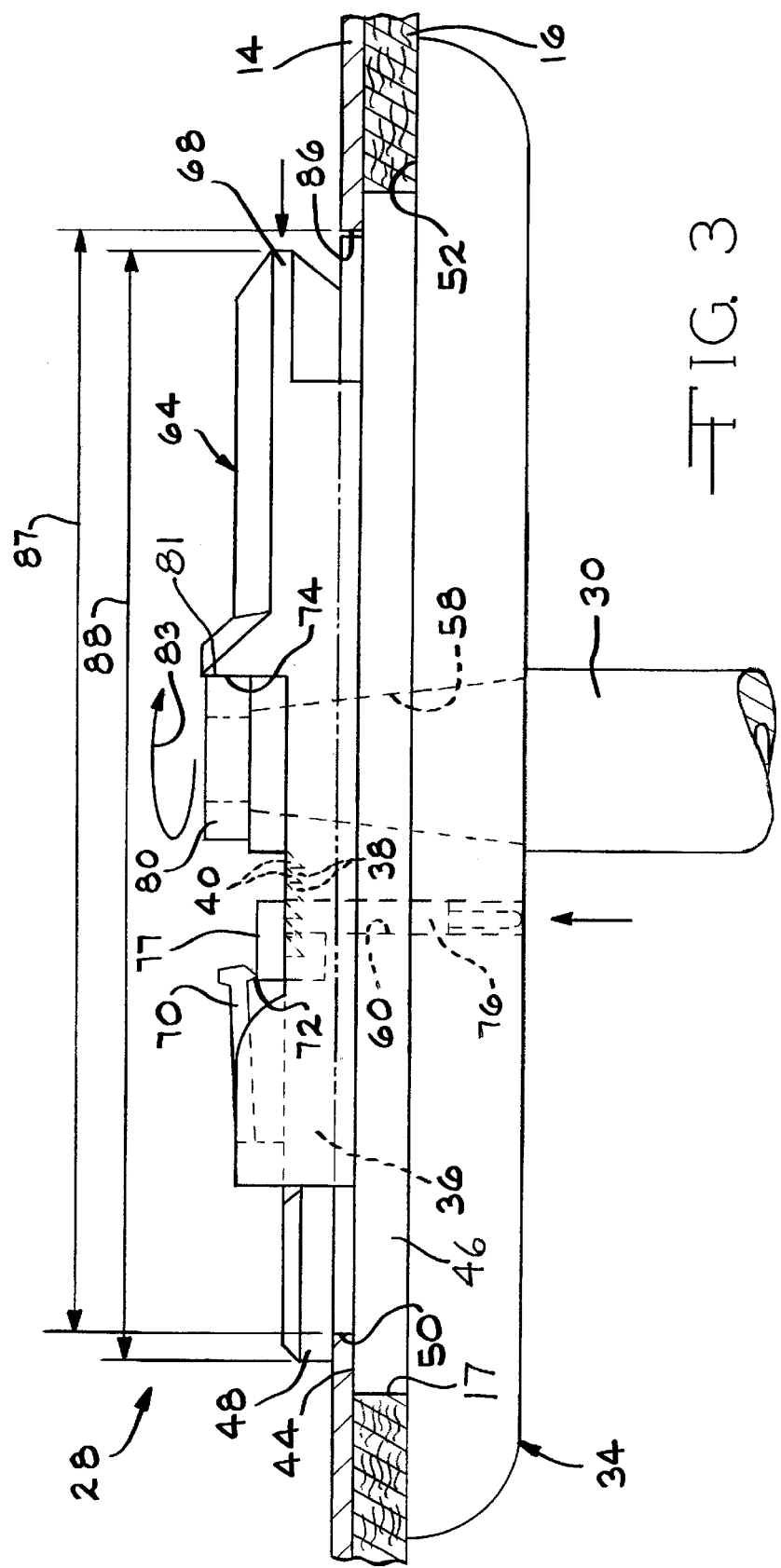
FIG. 3 is a perspective view of the visor bracket assembly illustrated in FIG. 2 showing the visor mount assembly in the retracted position.
Figure 4:
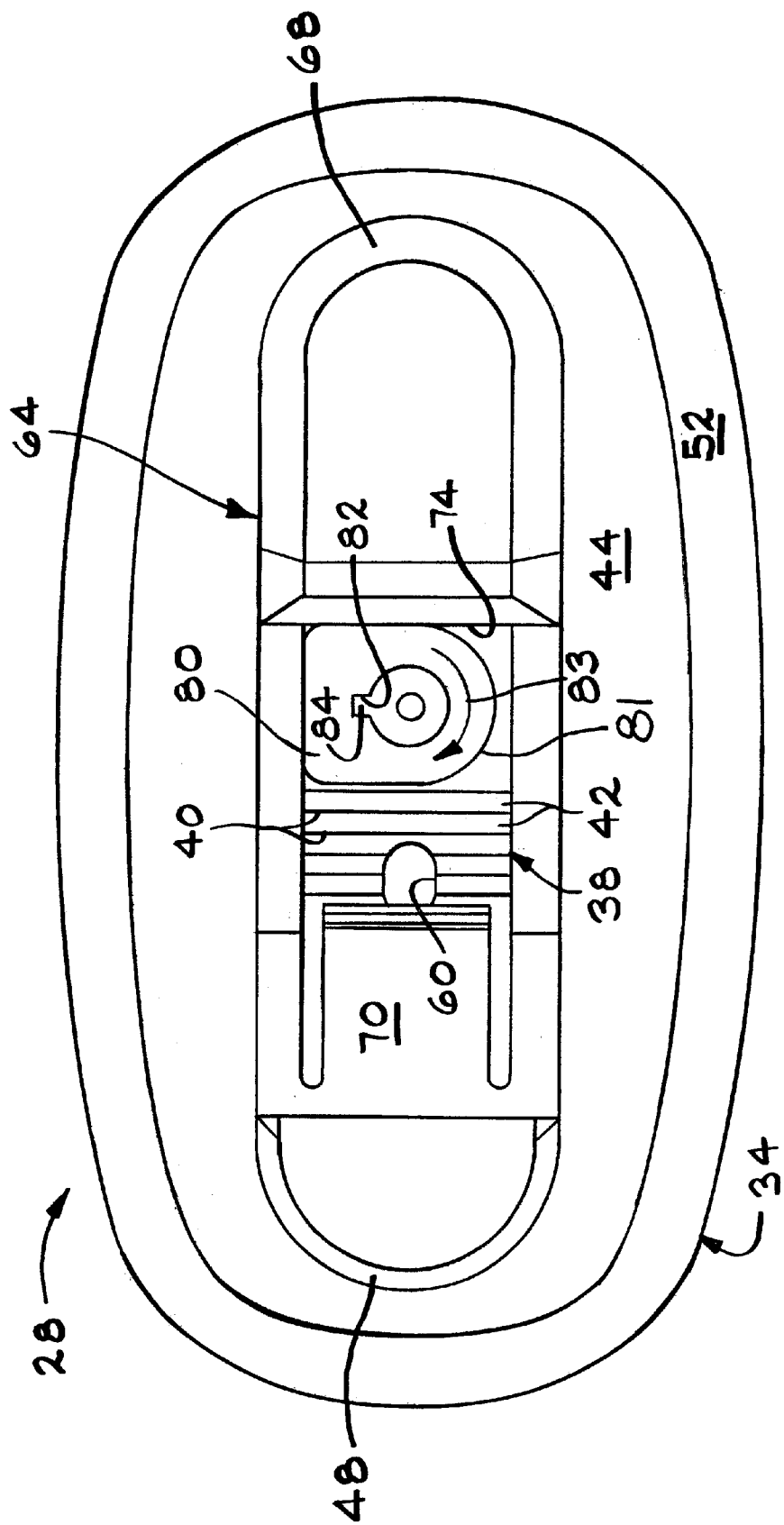
FIG. 4 is a top plan view of the visor bracket assembly illustrated in FIGS. 2 and 3 showing the visor mount assembly in the retracted position and the sheet metal of the vehicle roof removed.

A cam arm 80 is then attached to the end 31 of the visor arm 30 in a first position, as shown in FIGS. 3 and 4. Preferably, the cam arm 80 includes a keyway 82 for receiving a key 84 formed on the visor arm 30. The cam arm 80 can then be attached to the visor arm 30 by any desired method. Preferably, the cam arm 80 is press-fit to the visor arm 30, although such is not required. The cam arm 80 can also be attached to the visor arm 30 by any desired method, such as with an adhesive.

As shown in FIGS. 3 and 5, the combined latch 64 and latch receiving portion 36 of the visor bracket assembly 28 can then be inserted into a roof aperture 86. Preferably, the roof aperture 86 has a substantially oval shape corresponding to the shape of the combined latch 64 and latch receiving portion 36 of the visor bracket assembly 28. Preferably, a length 87 of the aperture 86 is slightly smaller than a length 88 of the combined latch 64 and latch receiving portion 36 when the bracket assembly is in the inwardly retracted position.

First, the visor bracket assembly 28 is moved to the inwardly retracted position, as shown in FIGS. 3 and 4. Then, the bracket assembly 28 is inserted into the roof aperture 86 in a substantially rocking motion. In such a rocking motion, one of the bracket flange 48 and the latch flange 68 is first inserted into the roof aperture 86, and the opposite flange is then rotated upwardly.

Preferably, the headliner 16 includes a headliner aperture 17 corresponding to the shape of the first bracket portion 46, as shown in FIGS. 3 and 5. Once the visor bracket assembly 28 is inserted into the roof aperture 86, the first engagement surface 44 engages a surface of the roof 14, and the second engagement surface 52 engages a surface of the headliner 16.

The visor arm 30 can then be rotated. Rotation of the visor arm 30 causes the cam arm 80 to rotate relative to the bracket 34. Preferably, the cam arm 80 is rotated about 90 degrees clockwise, as shown by arrow 83 in FIGS. 3 and 4, to a second position. As the cam arm 80 is rotated to the second position, a surface 81 of the cam arm 80 engages the camming surface 74 of the latch 64, urging the latch into an outwardly extended position, as shown in FIGS. 5 and 6. The sheet metal of the roof 14 is thereby locked between the first engagement surface 44 and the leading edges of the bracket flange 48 and the latch flange 68, respectively. Simultaneous with the movement of the latch 64 from the retracted position to the extended position, the ratchet pawl 72 of the flexible leg 70 is caused to move over the ratchet grooves 42 of the bracket 34 to the locked position. Specifically, as shown in FIGS. 5 and 6, the ratchet pawl 72 is urged into engagement with one of the grooves 42, preventing inward movement of the latch 64 (e.g. preventing movement of the bracket assembly 28 from the extended position to the retracted position). Such a locked position further prevents inadvertent disassembly of the visor bracket assembly 28.

The visor bracket assembly 28 can be disassembled or removed from the roof 14 by first applying an upward force to the release button 76, thereby moving the release button 76 upwardly and into the second position, as viewed in FIG. 3. Such upward movement of the button 76 urges the flexible leg 70 upward, disengages the ratchet pawl 72 from the groove 42, as shown in FIG. 3, and moves the bracket assembly 28 into the unlocked position. The visor arm 30 can then be rotated about 90 degrees in a direction opposite the direction used during installation (counter clockwise as viewed in FIGS. 3 and 4). Such counter clockwise rotation causes the cam arm 80 to disengage the camming surface 74, and return to the first position, as shown in FIGS. 3 and 4. The latch 64 can then be moved to the retracted position by any desired method. Preferably, a force is applied to the visor arm 30 in the direction of the latch flange 68, thereby causing the latch 64 to slide inwardly toward the retracted position, as shown in FIGS. 3 and 4. The visor bracket assembly 28 can then be removed from the roof aperture 86.

An important aspect of the present invention is that the visor mount assembly provides a simple design which is easy to assemble and install in the vehicle. Additionally, although the illustrated embodiment is shown having a release button 76, such a button is not required. For example, a tool, such as a screwdriver (not shown), can be inserted into the second aperture 60. An upward force can then be applied to the tool so as to urge the flexible leg 70 upward and disengage the ratchet pawl 72 from the groove 42, as shown in FIG. 3. The visor arm 30 and attached cam arm 80 can then be rotated in a desired direction so as to selectively engage and disengage the camming surface 74, as previously described. The latch 64 can then be moved to the retracted position, such as by applying a force to the visor arm 30 in the direction of the latch flange 68, as previously described.

The principle and mode of operation of this invention have been described in its preferred embodiments. However, it should be noted that this invention may be practiced otherwise than as specifically illustrated and described without departing from its scope. For example, modifications to the invention can include, but are not limited to, modifying the shape of the bracket, latch, cam arm, and release button. In addition, the bracket assembly can be used to secure other interior components in a vehicle. For example, the bracket assembly can be used to attach components to a door panel.

What is claimed is:

1. A mount assembly for securing a visor to a vehicle mounting surface, said mount assembly comprising:
   a bracket having a first aperture;
   a latch slidably mounted relative to said bracket; and
   an arm disposed within said first aperture, wherein the rotation of said arm causes said latch to slide relative to said bracket;
   wherein when said bracket is inserted into an opening in a mounting surface, the sliding of said latch fastens said bracket to said mounting surface.

2. The mount assembly according to claim 1, wherein said bracket includes a second aperture, a pin being disposed within said second aperture, said mount assembly being in a locked position when said pin is in a first position, said mount assembly being in an unlocked position when said pin is in a second position.

3. The mount assembly according to claim 1, wherein said bracket includes a bracket flange defining a groove between said bracket flange and an engagement surface of said bracket.

4. The mount assembly according to claim 3, wherein said bracket flange has a substantially beveled leading edge.

5. The mount assembly according to claim 2, wherein said latch includes a flexible leg.

6. The mount assembly according to claim 1, wherein said latch includes a latch flange defining a groove between said latch flange and an engagement surface of said bracket.

7. The mount assembly according to claim 6, wherein said latch flange has a substantially beveled leading edge.

8. The mount assembly according to claim 6, wherein said bracket includes a plurality of ratchet grooves.

9. The mount assembly according to claim 8, wherein said flexible leg includes a ratchet pawl for engagement with said ratchet grooves.

10. The mount assembly according to claim 1, wherein said first aperture of said bracket is substantially tapered.

11. The mount assembly according to claim 1, wherein said bracket includes a cam arm attached to said arm, said latch being in an inwardly retracted position when said cam arm is in a first position, said latch being in an outwardly extended position when said cam arm is in a second position.

12. The mount assembly according to claim 1, wherein said arm is an automotive visor arm.

13. A method of securing a visor to a vehicle mounting surface, the method comprising the steps of:
   a. providing a vehicle mounting surface having an aperture formed therein;
   b. providing a bracket assembly including a bracket having a first aperture, a latch slidably mounted relative to the bracket, and an arm disposed within the first aperture of the bracket;
   c. rotating the arm to a first position wherein the latch is caused to move to an inwardly retracted position;
   d. placing the bracket assembly adjacent the mounting surface such that a portion of the bracket and the latch are inserted into the aperture in the mounting surface; and
   e. rotating the arm to a second position wherein the latch is caused to move to an outwardly extended position, the bracket thereby being locked relative to the mounting surface.

14. The method according to claim 13, wherein the bracket includes a second aperture, a pin being disposed within the second aperture, the mount assembly being in a locked position when the pin is in a first position, the mount assembly being in an unlocked position when the pin is in a second position.

15. The method according to claim 13, wherein the bracket includes a bracket flange defining a groove between the bracket flange and an engagement surface of the bracket.

16. The method according to claim 13, wherein the bracket flange has a substantially beveled leading edge.

17. The method according to claim 13, wherein the latch includes a flexible leg.

18. The method according to claim 13, wherein the latch includes a latch flange defining a groove between the latch flange and an engagement surface of the bracket.

19. The method according to claim 13, wherein the latch flange has a substantially beveled leading edge.

20. The method according to claim 13, wherein the bracket includes a plurality of ratchet grooves.

21. The method according to claim 20, wherein the flexible leg includes a ratchet pawl for engagement with the ratchet grooves.

22. The method according to claim 13, wherein the first aperture of the bracket is substantially tapered.

23. The method according to claim 13, wherein the bracket includes a cam arm attached to the arm, the latch being in an inwardly retracted position when the cam arm is in a first position, the latch being in an outwardly extended position when the cam arm is in a second position.

24. The method according to claim 13, wherein the arm is an automotive visor arm.

* * * * *